US012512235B2

(12) United States Patent
Kumada et al.

(10) Patent No.: US 12,512,235 B2
(45) Date of Patent: Dec. 30, 2025

(54) DUPLEX TWISTED SHIELDED CABLE, AND WIRE HARNESS

(71) Applicant: YAZAKI CORPORATION, Tokyo (JP)

(72) Inventors: Taketo Kumada, Susono (JP); Toshiharu Shimizu, Susono (JP)

(73) Assignee: YAZAKI CORPORATION, Tokyo (JP)

(*) Notice: Subject to any disclaimer, the term of this patent is extended or adjusted under 35 U.S.C. 154(b) by 86 days.

(21) Appl. No.: 18/317,857

(22) Filed: May 15, 2023

(65) Prior Publication Data

US 2023/0411043 A1 Dec. 21, 2023

(30) Foreign Application Priority Data

Jun. 20, 2022 (JP) ................................ 2022-098651

(51) Int. Cl.
*H01B 11/10* (2006.01)
*H01B 7/00* (2006.01)

(52) U.S. Cl.
CPC ..... *H01B 11/1016* (2013.01); *H01B 11/1033* (2013.01); *H01B 7/0045* (2013.01)

(58) Field of Classification Search
CPC . H01B 11/1016; H01B 11/1033; H01B 11/06; H01B 11/002; H01B 11/02; H01B 11/085; H01B 7/0045
See application file for complete search history.

(56) References Cited

U.S. PATENT DOCUMENTS

| | | | | |
|---|---|---|---|---|
| 6,403,887 B1 * | 6/2002 | Kebabjian | H01B 11/1025 | 174/113 R |
| 2005/0029006 A1 * | 2/2005 | Takahashi | H01B 11/10 | 174/102 R |
| 2012/0301092 A1 * | 11/2012 | Le Dissez | G02B 6/4433 | 385/114 |

(Continued)

FOREIGN PATENT DOCUMENTS

| | | |
|---|---|---|
| JP | 2003-132743 A | 5/2003 |
| JP | 2007-265797 A | 10/2007 |

(Continued)

OTHER PUBLICATIONS

Tatum Jeremy: "2.2: The Ellipse—Physics LibreTexts",May 22, 2022 (May 22, 2022); Retrieved from the Internet:URL:https://phys.libretexts.org/Bookshelves/Astronomy_Cosmology/Celestial_Mechanics (Tatum)/02:_Conic_Sections/2.02:_The_Ellipse.

*Primary Examiner* — Paresh Paghadal
(74) *Attorney, Agent, or Firm* — KENEALY VAIDYA LLP

(57) ABSTRACT

There are provided a duplex twisted shielded cable and wire harness, the duplex twisted shielded cable including; two insulated wires that are twisted together, each having a conductor and an insulator covering the conductor; a metal foil shield provided around the two insulated wires; a metal braid provided on an outer periphery of the metal foil shield; and a sheath provided on an outer periphery of the metal braid. The metal foil shield includes a PET film layer and a metal layer. The PET film layer has a thickness of 20 μm or less, an ellipticity of the PET film layer is set to 0.75 or more and 0.90 or less, and the metal foil shield is longitudinally attached to the two insulated wires.

3 Claims, 8 Drawing Sheets

(56) References Cited

U.S. PATENT DOCUMENTS

| | | | | |
|---|---|---|---|---|
| 2014/0034352 | A1* | 2/2014 | Sugiyama | H01B 11/00 174/107 |
| 2014/0102756 | A1* | 4/2014 | Ishikawa | H01B 11/1895 174/115 |
| 2014/0182881 | A1* | 7/2014 | Huang | H01B 11/1091 174/103 |
| 2015/0170800 | A1* | 6/2015 | Sugiyama | H01B 13/0016 29/745 |
| 2015/0228377 | A1 | 8/2015 | Akimoto et al. | |
| 2016/0174422 | A1* | 6/2016 | Kobayashi | H01B 3/30 174/107 |
| 2017/0103830 | A1* | 4/2017 | Dettmer | H01B 11/203 |
| 2018/0005723 | A1* | 1/2018 | Kohori | H01B 3/30 |
| 2018/0096755 | A1* | 4/2018 | Tsujino | H01B 7/0241 |
| 2018/0286538 | A1* | 10/2018 | Hayakawa | H01B 7/1875 |
| 2019/0096546 | A1* | 3/2019 | Kumada | H05K 9/0098 |
| 2019/0341171 | A1 | 11/2019 | Uegaki et al. | |
| 2020/0168366 | A1* | 5/2020 | Uegaki | H01R 13/6581 |
| 2021/0125747 | A1* | 4/2021 | Shimizu | H01B 11/1091 |
| 2021/0383946 | A1* | 12/2021 | Chuganey | H01B 7/0892 |
| 2023/0039799 | A1* | 2/2023 | Kito | H01B 13/01254 |
| 2023/0066194 | A1* | 3/2023 | Kobayashi | H05K 9/0084 |
| 2023/0307156 | A1* | 9/2023 | Kobayashi | H01B 11/1025 |

FOREIGN PATENT DOCUMENTS

| | | | |
|---|---|---|---|
| JP | 2015-72774 | A | 4/2015 |
| JP | 2015-153497 | A | 8/2015 |
| JP | 2015-185527 | A | 10/2015 |
| JP | 2018-60685 | A | 4/2018 |
| JP | 2019-61766 | A | 4/2019 |
| WO | 2019/58437 | A1 | 3/2019 |

* cited by examiner

FIG. 4

| | | | | EXAMPLE 1 | EXAMPLE 2 | EXAMPLE 3 | COMPARATIVE EXAMPLE 1 |
|---|---|---|---|---|---|---|---|
| CROSS SECTION | | | | 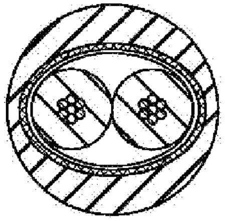 | 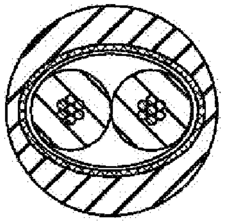 | 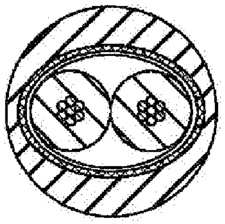 | 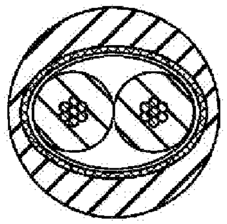 |
| STRUCTURE OUTLINE | CONDUCTOR | SIZE | --- | 0.13sq | 0.13sq | 0.13sq | 0.13sq |
| | | MATERIAL | --- | SOFT COPPER | SOFT COPPER | SOFT COPPER | SOFT COPPER |
| | | OUTER DIAMETER | mm | 0.48 | 0.48 | 0.48 | 0.48 |
| | INSULATOR | MATERIAL | --- | CROSSLINKED POLYOLEFIN | CROSSLINKED POLYOLEFIN | CROSSLINKED POLYOLEFIN | CROSSLINKED POLYOLEFIN |
| | | OUTER DIAMETER | mm | 1.22 | 1.22 | 1.22 | 1.22 |
| | OUTER SHIELD 1 | METAL LAYER THICKNESS | μm | 10 | 10 | 10 | 10 |
| | | PET LAYER THICKNESS | μm | 6 | 12 | 20 | 25 |
| | | CONFIGU-RATION | --- | LONGITUDINAL ATTACHMENT | LONGITUDINAL ATTACHMENT | LONGITUDINAL ATTACHMENT | LONGITUDINAL ATTACHMENT |
| | OUTER SHIELD 2 | CONFIGU-RATION | --- | BRAIDED SHIELD | BRAIDED SHIELD | BRAIDED SHIELD | BRAIDED SHIELD |
| | SHEATH | MATERIAL | --- | FLAME-RETARDANT POLYOLEFIN | FLAME-RETARDANT POLYOLEFIN | FLAME-RETARDANT POLYOLEFIN | FLAME-RETARDANT POLYOLEFIN |
| | FINISHED OUTER DIAMETER | | mm | 3.8 | 3.8 | 3.8 | 3.8 |

DUPLEX TWISTED SHIELDED CABLE, AND WIRE HARNESS

CROSS-REFERENCE TO RELATED APPLICATIONS

This application is based on and claims priority under 35 USC 119 from Japanese Patent Application No. 2022-098651 filed on Jun. 20, 2022, the contents of which are incorporated herein by reference.

TECHNICAL FIELD

The present disclosure relates to a duplex twisted shielded cable and a wire harness.

BACKGROUND ART

In the related art, there has been proposed a duplex shielded cable for high-speed digital signal transmission for the purpose of improving characteristics of a leakage attenuation amount at the time when a differential signal is applied. The duplex shielded cable includes two electric wires, a metal foil shield provided around the electric wires, a metal braid on the metal foil shield, and a sheath provided on the metal braid. A signal to be transmitted in such a duplex shielded cable has a high frequency, and considering a skin effect and a return current, it is effective for the duplex shielded cable to have a metal foil shield having a smooth surface.

Here, a shielded cable of multi-cores (three or more cores) has been proposed (for example, see JP2015-072774A, JP2003-132743A, and JP2015-153497A). In a shielded cable disclosed in JP2015-072774A, a pair of electric wires are shielded by a metal foil shield, and a large number of pairs of the shielded electric wires are arranged in a circle form.

A shielded cable disclosed in JP2003-132743A has a quad configuration in which four insulated wires (four core wires) are twisted at one time, and has a configuration in which a metal foil shield is provided around the four core wires, a duplex shielded cable is provided at an outer periphery of the metal foil shield, and further a sheath is provided on outer peripheries of the metal foil shield the duplex shielded cable.

A shielded cable disclosed in JP2015-153497A has a configuration in which three insulated wires (three core wires) are twisted at one time, a tubular member having magnetic powder is laterally wound (spirally wound) around the three core wires, and a sheath is provided on an outer periphery of the tubular member.

In addition, the following shielded cables have been proposed as duplex or single-core shielded cables (see JP2015-185527A, and JP2007-265797A). A shielded cable disclosed in JP2015-185527A has a configuration in which a metal foil shield is laterally wound (spirally wound) around two insulated wires (two core wires) arranged in parallel, and a resin tape is provided on an outer periphery of the metal foil shield.

Further, a shielded cable disclosed in JP2007-265797A has a configuration in which a metal foil shield is longitudinally attached to a periphery of one insulated wire arranged in parallel, a duplex shielded cable is provided on an outer periphery of the metal foil shield, and a sheath is further provided on an outer periphery of the duplex shielded cable.

Here, in a shielded cable, it is preferable that a metal foil shield is easily trimmed at terminal processing.

For this reason, the metal foil shield is preferably longitudinally attached to two insulated wires that are on an inner side, rather than spirally wound around two insulated wires. This is because, in the case of the spiral winding, it is difficult to trim a lower portion of overlapped metal foil shields at a wrap portion of the spirally wound metal foil shield. Therefore, in consideration of trimming, it can be said that longitudinal attachment is preferred for the metal foil shield.

However, when the metal foil shield is longitudinally attached to two insulated wires, the metal foil shield is easily provided along the two insulated wires, that is, in a state in which the metal foil shield is not in close contact with the two insulated wires, and a position of the metal foil shield with respect to the insulated wires is unstable, and transmission characteristics are easily deteriorated.

Therefore, in order to improve the transmission characteristics, it is conceivable to wind the metal foil shield around the two insulated wires so that the metal foil shield is in closer contact with the two insulated wires even if the metal foil shield is longitudinally attached. However, in a duplex twisted shielded cable in which two insulated wires are twisted, when a metal foil shield is brought into excessively close contact with the two insulated wires, the metal foil shield is likely to be broken due to a slight cable bending. That is, in a duplex parallel-shielded cable that is not twisted, since the two insulated wires are arranged in parallel, it can be expected, to a certain extent, that the insulated wires and a metal foil shield slip to one another when the cable is bent. On the other hand, in the case where the two insulated wires are twisted, even if slipping can be expected in a twist direction (spiral direction), an outer side in the bending is stretched in a cable longitudinal direction at the time of bending. For that reason, the stretch is in a direction different from the direction in which the slipping can be expected, and it cannot be expected the two insulated wires and the metal foil shield slip to one another, so that the metal foil shield is easily broken. Accordingly, in the duplex twisted shielded cable, when the metal foil shield is brought into an excessively close contact with the two insulated wires, there is a possibility that the metal foil shield is broken. Therefore, noise resistance is reduced to cause deterioration in the transmission characteristics eventually.

SUMMARY OF INVENTION

The present disclosure provides a duplex twisted shielded cable and a wire harness that can be more easily trimmed and can suppress deterioration of transmission characteristics.

According to an illustrative aspect of the present disclosure, a duplex twisted shielded cable includes; two insulated wires that are twisted together, each having a conductor and an insulator covering the conductor; a metal foil shield provided around the two insulated wires; a metal braid provided on an outer periphery of the metal foil shield; and a sheath provided on an outer periphery of the metal braid. The metal foil shield includes a PET film layer and a metal layer. The PET film layer has a thickness of 20 μm or less, an ellipticity of the PET film layer is set to 0.75 or more and 0.90 or less, and the metal foil shield is longitudinally attached to the two insulated wires.

According to another illustrative aspect of the present disclosure, a wire harness includes: the duplex twisted shielded cable according to the above aspect; and another member adjacent to the duplex twisted shielded cable.

BRIEF DESCRIPTION OF DRAWINGS

FIG. 4 is a table illustrating duplex twisted shielded cables according to Examples 1 to 3 and Comparative Example 1;

DESCRIPTION OF EMBODIMENTS

Hereinafter, the present disclosure will be described with reference to preferred embodiments. It should be noted that the present disclosure is not limited to the following embodiments, and modifications can be appropriately made without departing from the gist of the present disclosure. In addition, in the embodiments described below, although there are portions in which illustration and description of a part of the configuration are omitted, it is needless to say that a publicly known or well-known technique is appropriately applied to the details of the omitted technique within a range in which no contradiction with the contents described below occurs.

Figure 1:
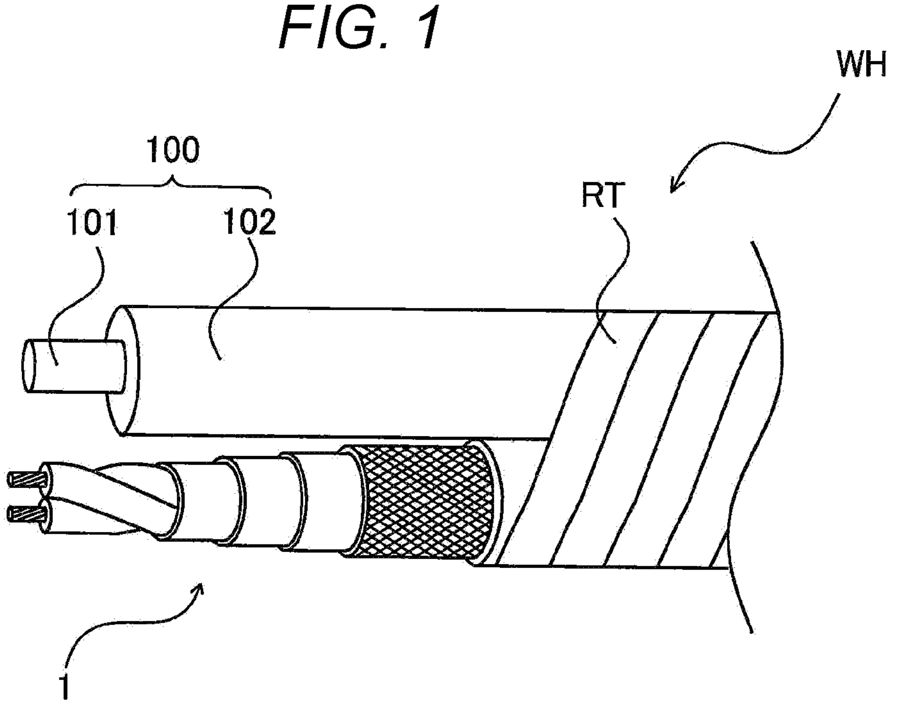
FIG. 1 is a perspective view of a wire harness including a duplex twisted shielded cable according to an embodiment of the present disclosure.

FIG. 1 is a perspective view of a wire harness including a duplex twisted shielded cable according to an embodiment of the present disclosure. As illustrated in FIG. 1, a wire harness WH includes a duplex twisted shielded cable 1 and another cable (another member) 100.

The other cable 100 is, for example, a thick electric wire such as a power line or a thin electric wire such as a signal line different from the power line, and includes a conductor 101 and an insulator 102 covering a periphery of the conductor 101. A resin tape RT is wound around the duplex twisted shielded cable 1 and the other cable 100, or a corrugated tube (not shown), a terminal (not shown), a connector, or the like is attached to the duplex twisted shielded cable 1 and the other cable 100.

Figure 2:
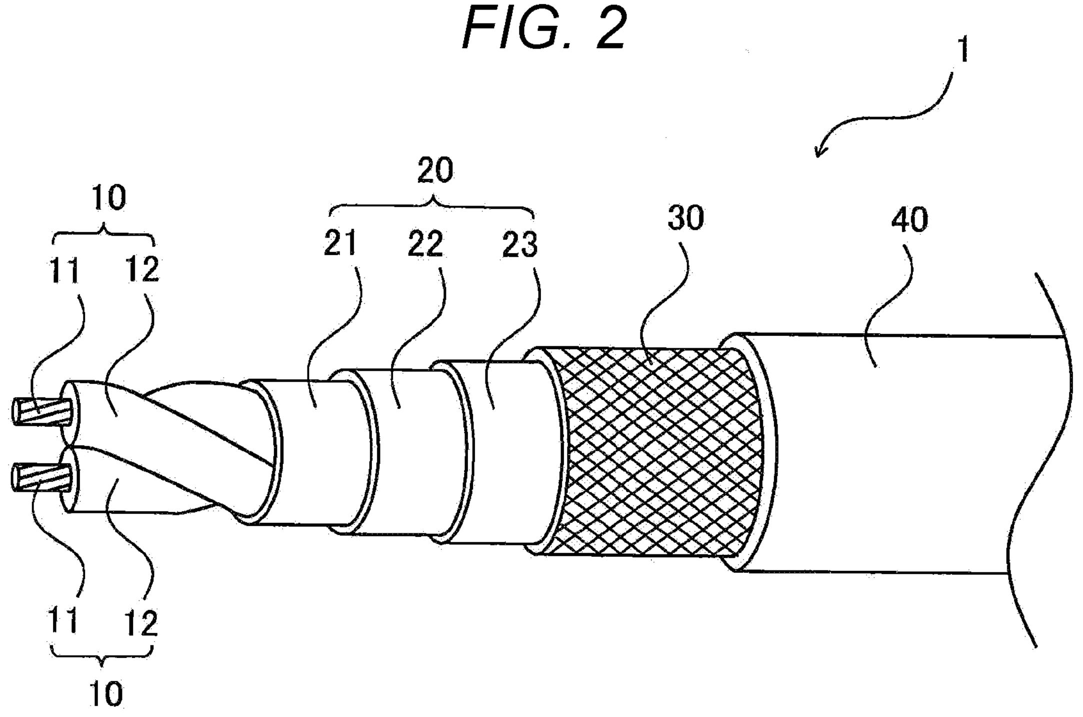
FIG. 2 is a perspective view illustrating the duplex twisted shielded cable shown in FIG. 1.
Figure 3:
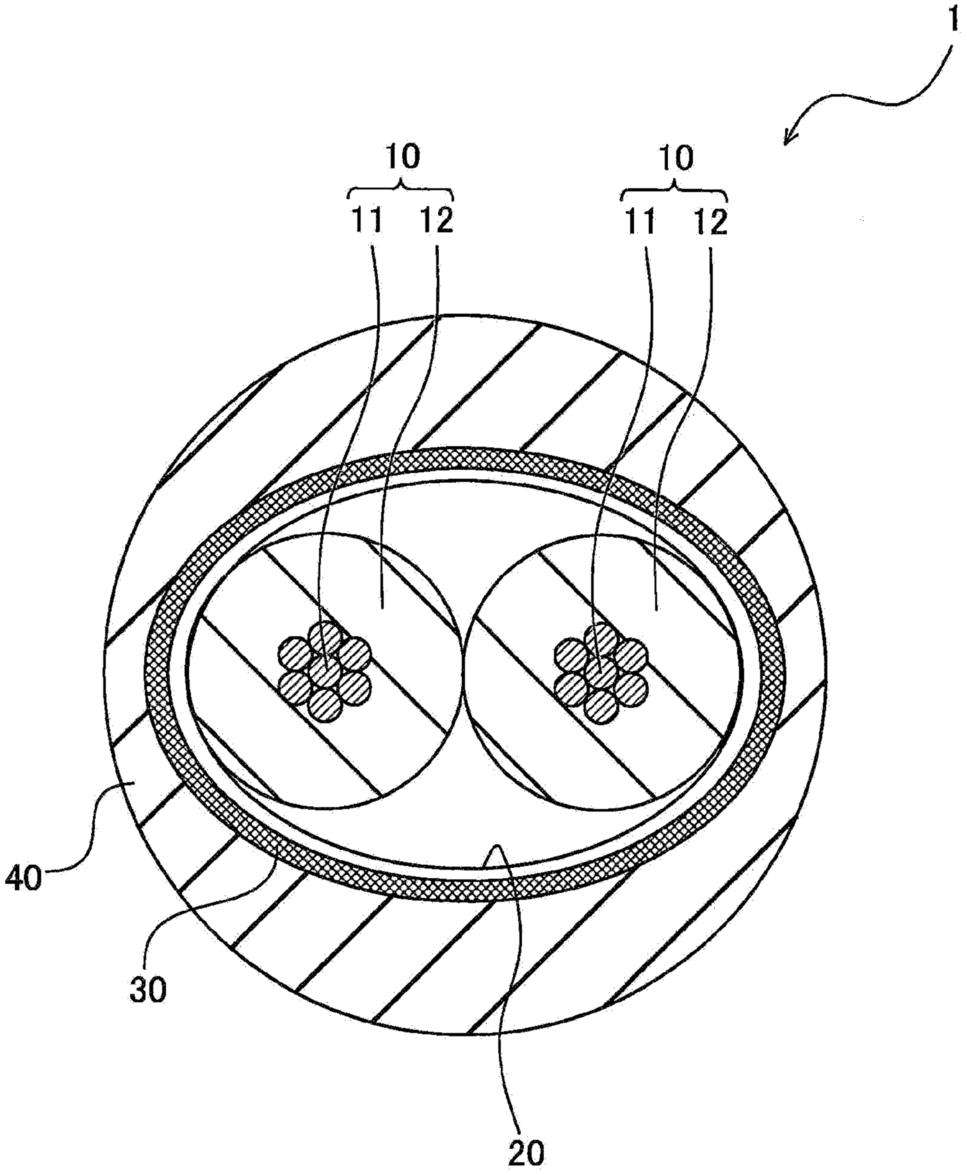
FIG. 3 is a cross-sectional view illustrating the duplex twisted shielded cable shown in FIG. 1.

FIG. 2 is a perspective view illustrating the duplex twisted shielded cable 1 shown in FIG. 1, and FIG. 3 is a cross-sectional view illustrating the duplex twisted shielded cable 1 shown in FIG. 1. As illustrated in FIGS. 2 and 3, the duplex twisted shielded cable 1 includes two insulated wires 10, a metal foil shield 20, a metal braid 30, and a sheath 40.

The insulated wires 10 each include a conductor 11 and an insulator 12 on the conductor 11, and are twisted (twisted) so as to be helical with respect to each other. As the conductor 11, a soft copper wire, a silver-plated soft copper wire, a tin-plated soft copper wire, a tin-plated copper alloy wire, or the like is used. Although the conductor 11 is implemented by a twisted wire obtained by twisting two or more (specifically, seven) wires in the embodiment, the present disclosure is not particularly limited thereto. The conductor 11 may be implemented by one single wire. Further, although a cross-sectional area of the conductor 11 is assumed to be 0.22 sq ("sq" is a unit for indicating square millimeter) or less, the present disclosure is not particularly limited thereto.

The insulator 12 is a member covering the conductor 11. As the insulator 12, polyethylene (PE), polypropylene (PP), or the like is used. The insulator 12 has, for example, a dielectric constant of 3.0 or less. The insulator 12 preferably has a thickness of 0.52 mm or less based on the following formula (1).

$$Z_0 = \frac{120}{\sqrt{\varepsilon e}} \ln \frac{1.2B + 1.5dw}{k_1 d} [\Omega] \quad (1)$$

Here, $Z_0$ is a characteristic impedance and, for example, 100Ω is substituted. In addition, εe is a dielectric constant, and for example, a value of 3.0 or less is substituted. Further, dw is a wire diameter of the wires constituting the conductor 11, and is assumed to be 0.16 mm, for example. In addition, d is an outer diameter of the conductor 11, and is 0.48 mm when seven wires each having a wire diameter of 0.16 mm are twisted. $k_1$ is a conductor outer-diameter coefficient, and is 0.939 in the above example. B is a distance between centers of the conductors 11 of the two insulated wires 10. The thickness of the insulator 12 is calculated by substituting the above values and the like into formula (1), and is preferably 0.52 mm or less.

The metal foil shield 20 has a three-layer structure including a film layer (PET film layer) 21, an adhesive layer 22, and a metal layer 23, the adhesive layer 22 integrally bonding the film layer 21 and the metal layer 23. The film layer 21 is a non-conductive resin film and is made of polyethylene terephthalate (PET) resin. The film layer 21 is preferably a biaxially stretched film formed by stretching a resin film in two directions of a longitudinal direction and a lateral direction at a high temperature. This is because the biaxially stretched film can have high strength in the longitudinal direction and the lateral direction and is hard to break. In the embodiment, the film layer 21 has a thickness of 20 μm or less.

The metal layer 23 is a conductive metal layer and is made of a metal such as copper or aluminum. In the embodiment, the metal layer 23 preferably has a thickness of 20 μm or less. In addition, from the viewpoint of ensuring shielding performance, the metal layer 23 preferably has a thickness of 8 μm or more when made of copper, and preferably has a thickness of 10 μm or more when made of aluminum. For various types of metals, when the metal layer 23 has a thickness of 10 μm or more, the shielding performance can be sufficiently exhibited. Further, the metal foil shield 20 is longitudinally attached on the two insulated wires 10 so that the metal layer 23 is on an outer side.

The metal braid 30 is formed by weaving bundles of metal wires such as a soft copper wire, a silver-plated soft copper wire, a tin-plated soft copper wire, or a tin-plated copper alloy wire, each bundle including a plurality of the metal wires. The metal wire may be a plated fiber obtained by applying a metal plating on a fiber. Further, the metal braid 30 may be formed by weaving a flat bundle obtained by collectively applying a plating to a plurality of metal wires.

The sheath 40 is an insulator that covers an outer periphery of the metal braid 30. The sheath 40 is in a stuffing state on an outer peripheral side of the metal foil shield 20 and the metal braid 30. That is, the sheath 40 is provided in a so-called solid state rather than in a tube form having a void inside. By solid extrusion with respect to a component consisting of the insulated wires 10, the metal foil shield 20, and the metal braid 30, the sheath 40 is provided around the insulated wires 10, the metal foil shield 20, and the metal braid 30. The sheath 40 is made of, for example, PE, PP, and polyvinyl chloride (PVC). The sheath 40 is not limited to the solid state, and may be implemented in a tube shape and disposed in a state in which a void is provided at some parts with respect to the inner metal braid 30, or any other inclusion may be separately provided in the void.

Here, in the duplex twisted shielded cable 1 according to the embodiment, the thickness of the film layer 21 is 20 μm or less, and the rigidity is suppressed to a certain extent. Therefore, when the metal foil shield 20 is longitudinally attached to the two insulated wires 10, the metal foil shield 20 can be wound to fit a shape of the two insulated wires 10 that are twisted. This can contribute to stabilizing the position of the metal foil shield 20 with respect to the two insulated wires 10. In particular, when the thickness of the film layer 21 is 20 μm or less, as long as the metal layer 23 is not excessively thick, the metal foil shield 20 can be wound such that an ellipticity (an ellipticity in a cross section orthogonal to the longitudinal direction, the same applying hereinafter) with respect to the two insulated wires 10 is 0.90 or less.

In addition, in the duplex twisted shielded cable 1, the metal foil shield 20 is wound such that the ellipticity with respect to the two insulated wires 10 is 0.75 or more. Accordingly, in the duplex twisted shielded cable 1, the metal foil shield 20 is not wound around the two insulated wires 10 in a state where the metal foil shield 20 is in an excessively close contact with the two insulated electric wires 10.

Next, examples and comparative examples of the duplex twisted shielded cable 1 according to the embodiment will be described. FIG. 4 is a table illustrating duplex twisted shielded cables according to Examples 1 to 3 and Comparative Example 1. In the duplex twisted shielded cables according to Examples 1 to 3 and Comparative Example 1, a conductor was a twisted wire obtained by twisting seven soft copper wires together, and had a cross-sectional area of 0.13 sq. An outer diameter thereof was 0.48 mm. An insulator was made of a crosslinked polyolefin, and had an outer diameter of 1.22 mm as a result of covering the conductor.

An outer shield 1 was formed of a metal foil shield in which a thickness of a metal layer was 10 μm, and was longitudinally attached with respect to two insulated wires. An outer shield 2 was formed of a braided shield formed of a metal wire. A sheath was made of a flame-retardant polyolefin. With the above configuration, the duplex twisted shielded cables according to Examples 1 to 3 and Comparative Example 1 had a finished outer diameter of 3.8 mm.

In the metal foil shield serving as the outer shield 1, a thickness of a PET layer (film layer) was 6 μm in Example 1, 12 μm in Example 2, 20 μm in Example 3, and 25 μm in Comparative Example 1.

Figure 5:
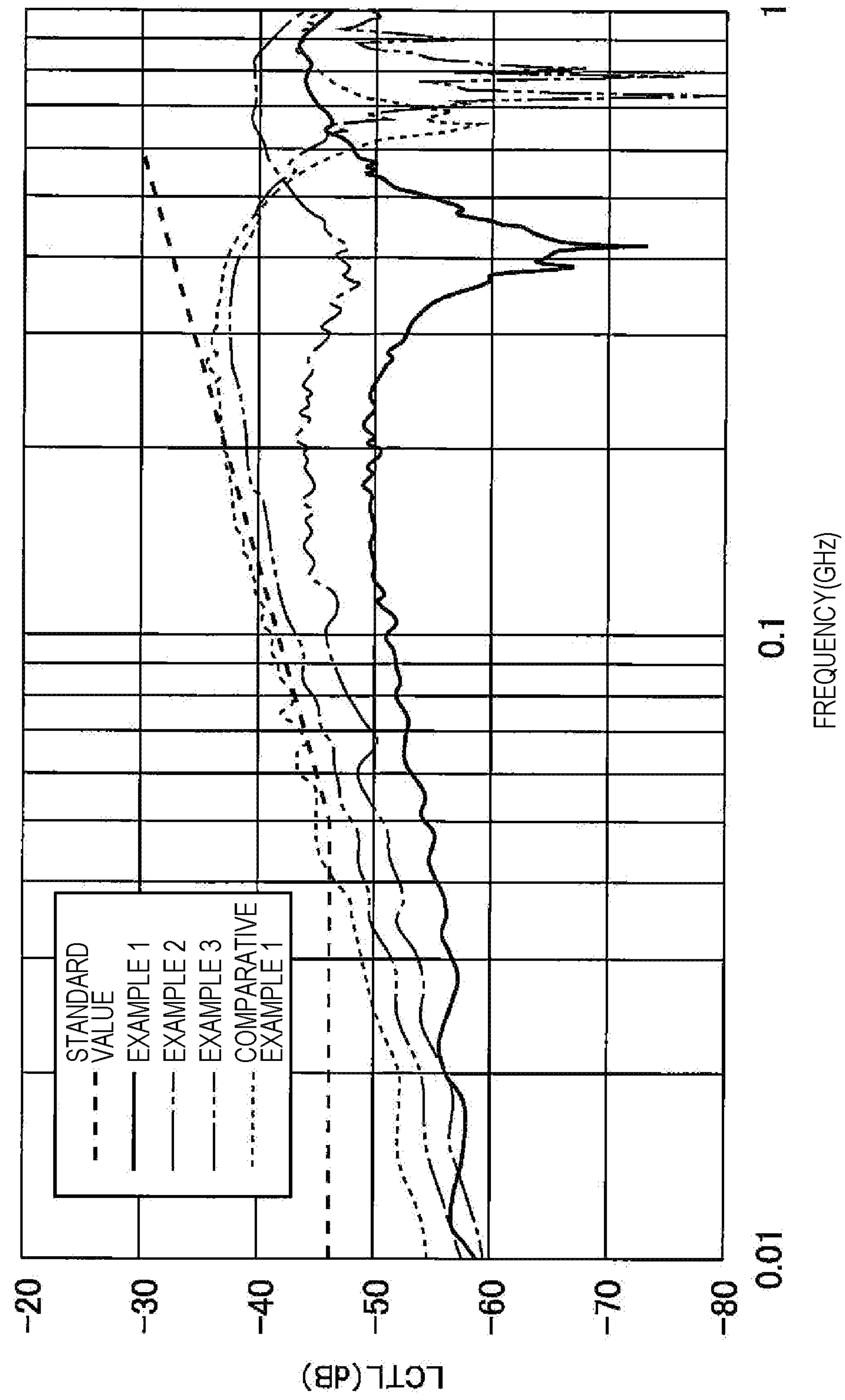
FIG. 5 is a graph illustrating transmission characteristics of the duplex twisted shielded cables according to Examples 1 to 3 and Comparative Example 1.

FIG. 5 is a graph illustrating transmission characteristics of the duplex twisted shielded cables according to Examples 1 to 3 and Comparative Example 1. As illustrated in FIG. 5, regarding Examples 1 to 3, a result was shown that a standard value was satisfied in the entire frequency range of 0.01 GHz to 1 GHz. In contrast, regarding Comparative Example 1, a result was shown that the standard value was not satisfied in a range of more than 0.04 GHz to about 0.2 GHz. This is because an ellipticity was not 0.90 or less in Comparative Example 1.

Figure 6:
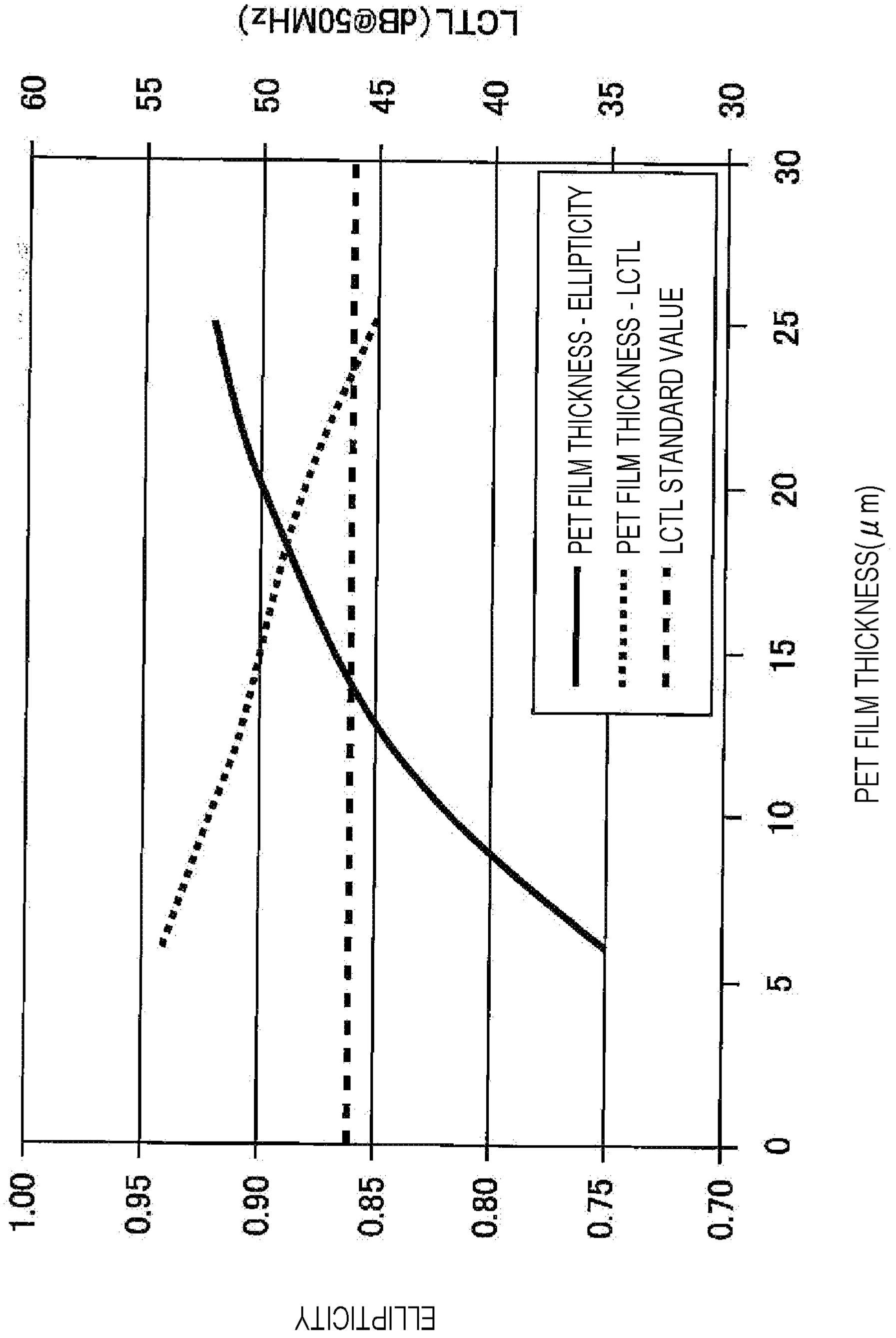
FIG. 6 is a graph illustrating correlation between a thickness of a film layer and an ellipticity of the duplex twisted shielded cables according to Examples 1 to 3 and Comparative Example 1.

FIG. 6 is a graph illustrating correlation between the thickness of the film layer and an ellipticity of the duplex twisted shielded cables according to Examples 1 to 3 and Comparative Example 1. As illustrated in FIG. 6, in Examples 1 to 3, when the thickness of the film layer was 6 μm, 12 μm, and 20 μm, the ellipticity was 0.75, 0.83, and 0.90, respectively. Therefore, the ellipticity was 0.90 or less in all examples, and it can be said that the metal foil shield was wound in a manner of conforming to a shape of the two insulated wires to some extent. Therefore, regarding the transmission characteristics, as illustrated in FIG. 5, the standard value was satisfied.

On the other hand, in the duplex twisted shielded cable according to Comparative Example 1, the thickness of the film layer was 25 μm, and the ellipticity exceeded 0.90. Therefore, the metal foil shield was not wound in a manner of conforming to the shape of the two insulated wires, and regarding the transmission characteristics, a result was shown that the standard value was not satisfied as illustrated in FIG. 5.

In the example shown in FIG. 6, the thickness of the metal layer is 10 m. However, although not shown, it was also found that, in a case where the thickness of the film layer was m, even if the thickness of the metal layer was 40 μm, there was no problem in setting the ellipticity to 0.90 or less by a winding method at the time of longitudinal attachment. In addition, it was also found that the thickness of the metal layer is preferably 20 μm or less in order to easily achieve the ellipticity of 0.90 or less.

In addition, the duplex twisted shielded cables according to Examples 1 to 3 and Comparative Example 2 (the thickness of the film layer in Comparative Example 1 was set to 4 μm in Comparative Example 2) were subjected to a 180° bending test. The 180° bending test is implemented under a condition where a weight W of 200 g was suspended from one end (lower end) of the duplex twisted shielded cable, an upper portion (a portion at a slightly lower end side of an upper end) of the duplex twisted shielded cable was sandwiched between a pair of mandrel M having a diameter of 30 mm. Next, the other end (upper end) of the duplex twisted shielded cable was repeatedly bent along the mandrel M at a bending angle of 180°. In the repeated bending, the number of times of bending at the time when a resistance value of the metal foil shield increased by 10% was measured.

As a result, the number of times of bending was about 400 in Example 1, about 500 in Example 2, and about 600 in Example 3, all exceeding 300. In contrast, regarding Comparative Example 2 in which the thickness of the film layer of the metal foil shield was set to 4 μm, the number of times of bending was about 200, which was less than 300. Therefore, when the ellipticity is less than 0.75, deterioration of noise resistance performance (deterioration of transmission characteristics) due to breakage of the metal foil shield was confirmed.

Figure 7:
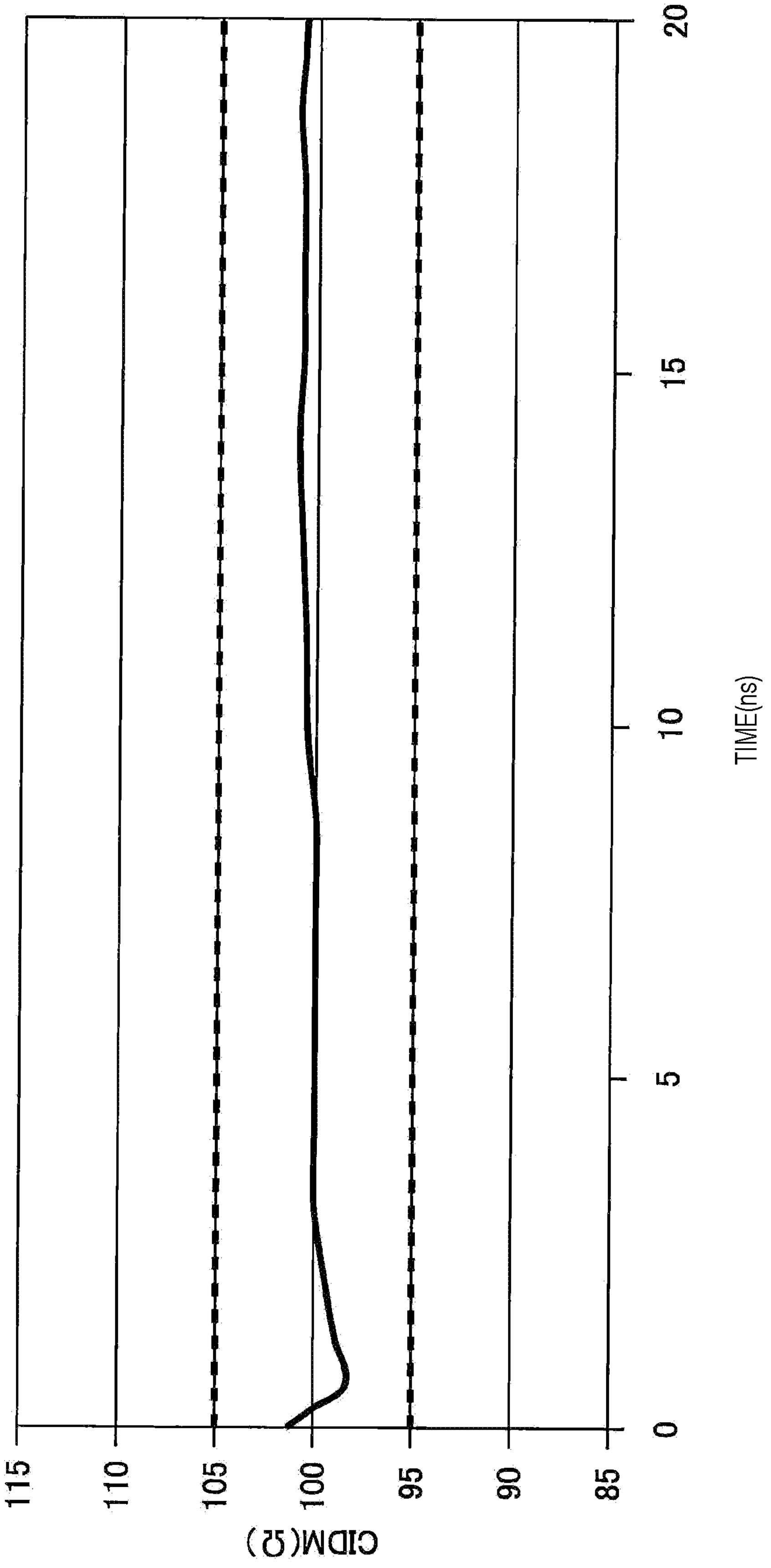
FIG. 7 is a graph illustrating the transmission characteristics and characteristic impedance of the duplex twisted shielded cable according to Example 2.
Figure 8:
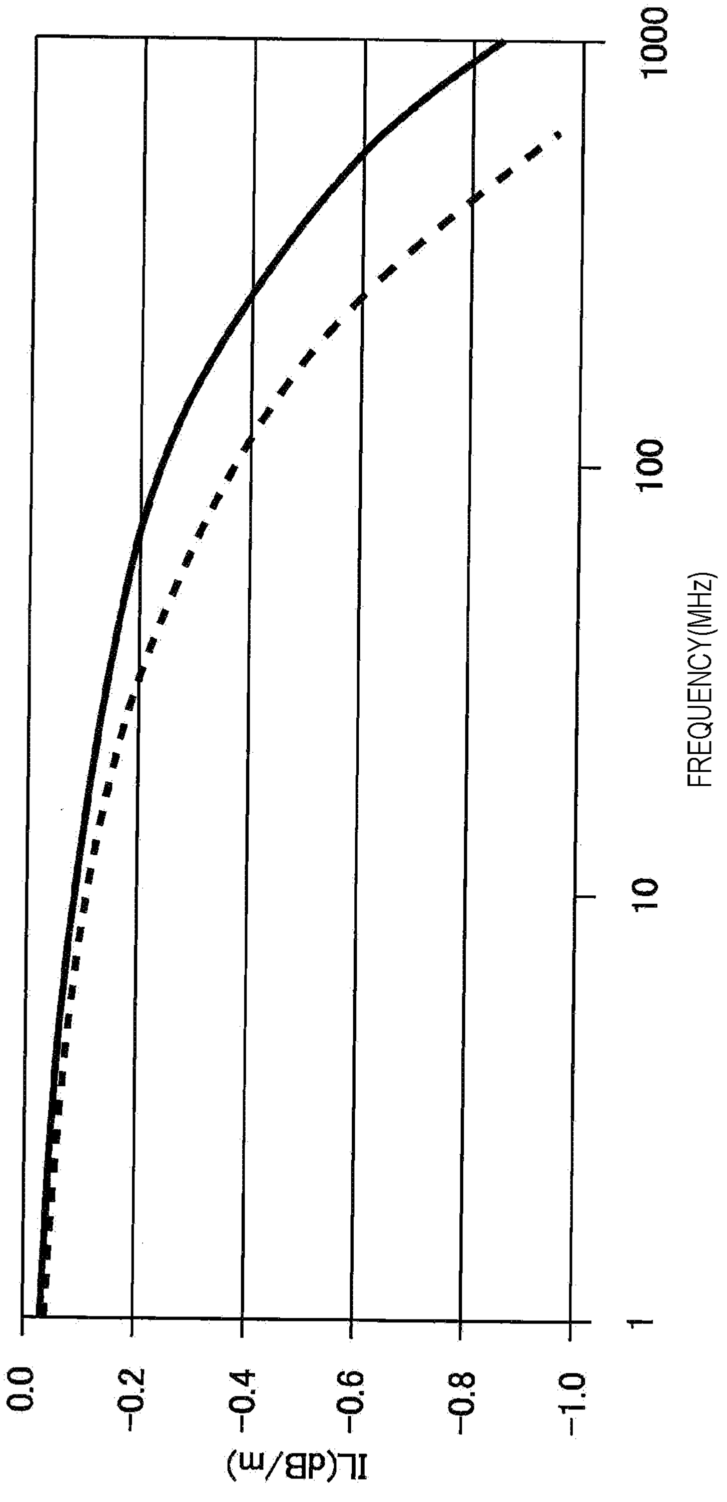
FIG. 8 is a graph illustrating the transmission characteristics of the duplex twisted shielded cable according to Example 2, showing insertion loss.
Figure 9:
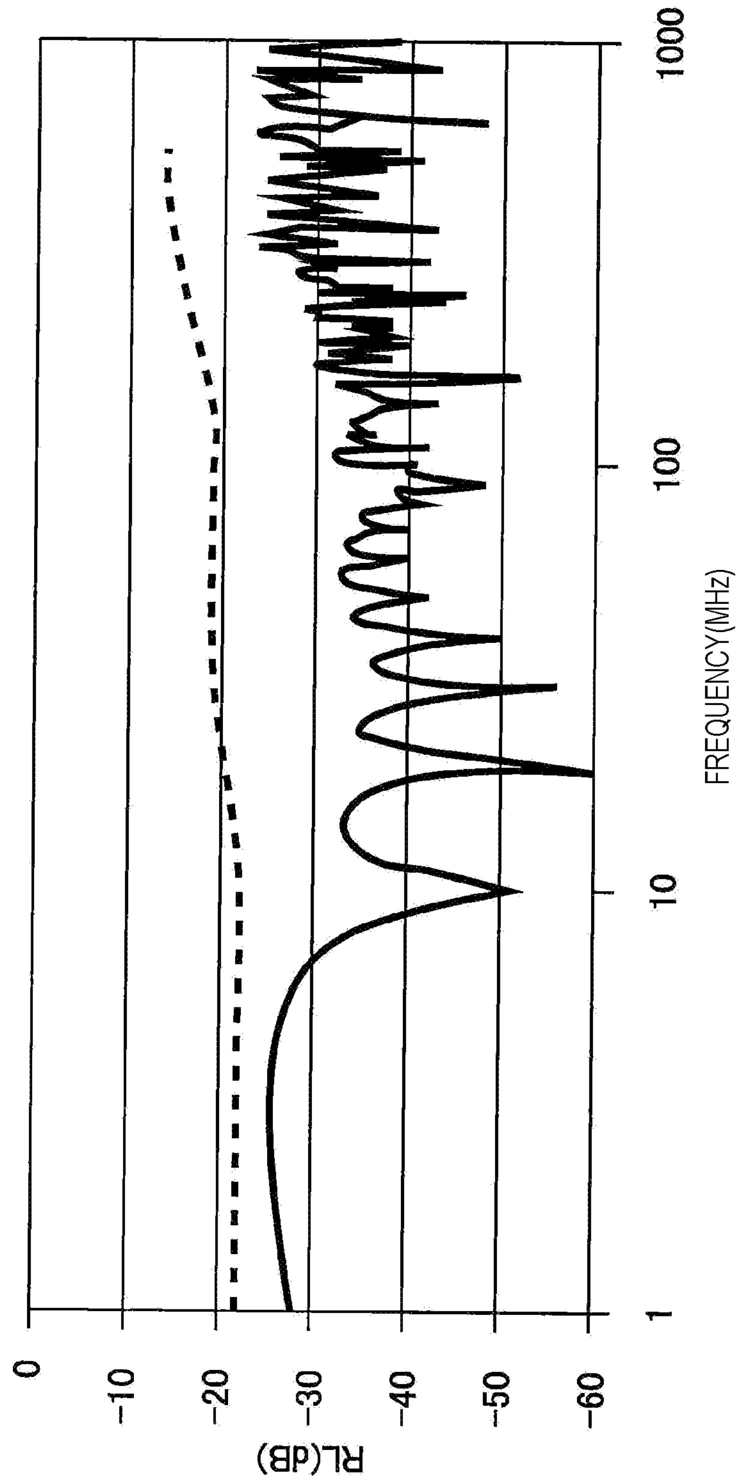
FIG. 9 is a graph illustrating the transmission characteristics of the duplex twisted shielded cable according to Example 2, showing reflection loss.

FIGS. 7 to 9 are graphs illustrating the transmission characteristics of the duplex twisted shielded cable according to Example 2. FIG. 7 is a graph illustrating a characteristic impedance. FIG. 8 is a graph illustrating an insertion loss. FIG. 9 is a graph illustrating a reflection loss. In FIGS. 7 to 9, broken lines indicate standard values.

As illustrated in FIG. 7, the characteristic impedance of the duplex twisted shielded cable according to Example 2 was maintained at around 100Ω, and the standard value of 95Ω or more and 105Ω or less was satisfied.

As illustrated in FIG. 8, the duplex twisted shielded cable according to Example 2 had a small insertion loss in the entire frequency range of 1 MHz to 1000 MHz and the standard value was satisfied.

Further, as illustrated in FIG. 9, the duplex twisted shielded cable according to Example 2 had a small reflection loss in the entire frequency range of 1 MHz to 1000 MHz and the standard value was satisfied.

In this way, according to the duplex twisted shielded cable 1 of the embodiment, since the metal foil shield 20 is attached longitudinally to the metal foil shield 20 to be provided therearound, trimming can be easily performed. In addition, since the thickness of the film layer 21 of the metal foil shield 20 is 20 μm or less and the ellipticity is 0.90 or less, the metal foil shield 20 is brought into close contact with the two insulated electric wires 10 to a certain extent so that the position of the metal foil shield 20 with respect to the two insulated wires 10 is unlikely to be unstable, and deterioration of the transmission characteristics can be suppressed. Further, since the ellipticity of the metal foil shield 20 is 0.75 or more, the metal foil shield 20 is not in an excessively close contact with the two insulated wires 10, which contributes to prevention of a situation where the metal foil shield 20 easily breaks at the time of bending, and the deterioration of the transmission characteristics due to breakage of the metal foil shield 20 can be suppressed. Accordingly, it is possible to provide the duplex twisted shielded cable 1 that can be more easily trimmed and can suppress deterioration of the transmission characteristics.

In addition, since the thickness of the metal layer 23 is 20 μm or less, it is possible to suppress a situation in which it is difficult to achieve an ellipticity of 0.90 or less when the metal layer 23 is too thick.

In addition, according to the wire harness WH of the embodiment, it is possible to provide the wire harness WH that can be more easily trimmed and can suppress deterioration of the transmission characteristics.

Although the present disclosure has been described above based on the embodiments, the present disclosure is not limited to the above embodiments. Modifications may be made without departing from the gist of the present disclosure and publicly known or well-known techniques may be appropriately combined.

For example, although the metal foil shield 20 is disposed such that the metal layer 23 faces an outer side of the metal foil shield 20 in the duplex twisted shielded cable 1 in the above-described embodiments, the present disclosure is not limited thereto, and the metal foil shield 20 may face an inner side of the metal foil shield 20.

In addition, in the duplex twisted shielded cable 1 according to the embodiment, it is assumed that the metal braid 30 is attached to a shielded connector. Alternatively, the attachment target may not be a shielded connector.

According to a first aspect of the present disclosure, a duplex twisted shielded cable (1) includes; two insulated wires (10) that are twisted together, each having a conductor (11) and an insulator (12) covering the conductor (11); a metal foil shield (20) provided around the two insulated wires (10); a metal braid (30) provided on an outer periphery of the metal foil shield (20); and a sheath (40) provided on an outer periphery of the metal braid (30). The metal foil shield (20) includes a PET film layer (21) and a metal layer (23). The PET film layer (21) has a thickness of 20 μm or less, an ellipticity of the PET film layer (21) is set to 0.75 or more and 0.90 or less, and the metal foil shield (20) is longitudinally attached to the two insulated wires (10).

According to a second aspect of the present disclosure, the metal layer (23) of the metal foil shield (20) may have a thickness of 20 μm or less.

According to a third aspect of the present disclosure, a wire harness (WH) may include: the duplex twisted shielded cable (1) according to the aspect 1 or 2; and another member (100) adjacent to the duplex twisted shielded cable (1).

According to the present disclosure, it is possible to provide a duplex twisted shielded cable and a wire harness that can be more easily trimmed and can suppress deterioration of transmission characteristics.

What is claimed is:

1. A duplex twisted shielded cable comprising;
two insulated wires that are twisted together, each having a conductor and an insulator covering the conductor;
a metal foil shield provided around the two insulated wires;
a metal braid provided on an outer periphery of the metal foil shield; and
a sheath provided on an outer periphery of the metal braid, wherein
the metal foil shield includes:
a PET film layer that contacts the two insulated wires; and
a metal layer that is located between the PET film layer and the metal braid, the outer periphery of the metal foil shield is a top surface of the metal layer, and the top surface of the metal layer contacts the metal braid, and
a sum total of a thickness of the PET film layer and a thickness of the metal layer is 16 μm or more and 30 μm or less, the thickness of the PET film layer is 12 μm or less, an ellipticity of the PET film layer is set to 0.75 or more and 0.90 or less, and the metal foil shield is longitudinally attached to the two insulated wires.

2. The duplex twisted shielded cable according to claim 1, wherein
the metal layer of the metal foil shield has a thickness of 20 μm or less.

3. A wire harness comprising:
the duplex twisted shielded cable according to claim 1; and
another member adjacent to the duplex twisted shielded cable.

* * * * *